US007986298B1

(12) United States Patent
Dulaney et al.

(10) Patent No.: US 7,986,298 B1
(45) Date of Patent: Jul. 26, 2011

(54) IDENTIFYING CHANGES TO AN IMAGE FILE

(75) Inventors: Marissa Dulaney, Morgan Hill, CA (US); Elwan S. Johnson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 908 days.

(21) Appl. No.: 11/313,121

(22) Filed: Dec. 19, 2005

(51) Int. Cl.
*G09G 5/00* (2006.01)
(52) U.S. Cl. ........................................ 345/156; 345/619
(58) Field of Classification Search .................. 345/156, 345/581, 619; 382/162, 167
See application file for complete search history.

(56) References Cited

U.S. PATENT DOCUMENTS

| 5,463,730 | A | * | 10/1995 | Hatada | 715/810 |
| 5,485,565 | A | * | 1/1996 | Saund et al. | 345/442 |
| 5,548,663 | A | * | 8/1996 | Sekine et al. | 382/164 |
| 5,586,239 | A | * | 12/1996 | Ueda | 715/207 |
| 5,659,639 | A | * | 8/1997 | Mahoney et al. | 382/309 |
| 6,184,860 | B1 | * | 2/2001 | Yamakawa | 715/823 |
| 6,448,956 | B1 | | 9/2002 | Berman et al. | |
| 6,567,830 | B1 | * | 5/2003 | Madduri | 715/235 |
| 6,701,844 | B1 | | 3/2004 | Roy | |
| 6,724,435 | B2 | | 4/2004 | Segman | |
| 6,791,709 | B1 | * | 9/2004 | Nakamura et al. | 358/1.18 |
| 6,795,209 | B1 | * | 9/2004 | Patton et al. | 358/1.18 |
| 6,873,336 | B1 | | 3/2005 | Sailus et al. | |
| 6,879,717 | B2 | * | 4/2005 | Aggarwal et al. | 382/167 |
| 6,931,633 | B1 | | 8/2005 | Vazquez et al. | |
| 6,956,966 | B2 | | 10/2005 | Steinberg | |
| 6,993,719 | B1 | | 1/2006 | Edwards et al. | |
| 7,193,634 | B2 | * | 3/2007 | Suzuki et al. | 345/629 |
| 7,254,270 | B2 | * | 8/2007 | Simske | 382/224 |
| 7,342,695 | B2 | | 3/2008 | Matsugi | |
| 2002/0172498 | A1 | | 11/2002 | Esenyan et al. | |
| 2003/0174146 | A1 | | 9/2003 | Kenoyer | |
| 2004/0120596 | A1 | * | 6/2004 | Ishii et al. | 382/254 |
| 2004/0169873 | A1 | | 9/2004 | Nagarajan | |
| 2005/0212817 | A1 | * | 9/2005 | Cannon et al. | 345/619 |
| 2005/0233296 | A1 | * | 10/2005 | Ziv-el et al. | 434/350 |

FOREIGN PATENT DOCUMENTS

JP      08263688 A  * 10/1996

OTHER PUBLICATIONS

Rother et al. "'GrabCut'—Interactive Foreground Extraction using Iterated Graph Cuts." Microsoft Research Cambridge, UK.
Ono, Philbert. "Print Club—Japan's photo sticker fad." PhotoGuide Japan A Guide to Photography in Japan. NewsZone. Jun. 2001. http://photojpn.org/news/modules.php?op=modload&name=Sections&file=index&req=viewarticle&artid=1&page=1.
Reese et al. "Image Editing with Intelligent Paint." Dept. of Computer Science, Brigham Young U., Provo Utah. The Eurographics Association. 2002.

* cited by examiner

*Primary Examiner* — Quan-Zhen Wang
*Assistant Examiner* — Tom V Sheng
(74) *Attorney, Agent, or Firm* — Van Pelt, Yi & James LLP (57) ABSTRACT

Editing an image is disclosed. Editing may include receiving a marking on the image, activating a command interface in response to the marking, receiving a command via the command interface, and applying the command to a portion of the image, where the portion is determined based at least in part on the marking.

32 Claims, 9 Drawing Sheets

IDENTIFYING CHANGES TO AN IMAGE FILE

BACKGROUND OF THE INVENTION

Digital photographs may be edited using an image editing application. For example, a photograph may be edited in order to fix perceived problems with the photograph, such as red eye, portions being too light or dark, or a color cast on the photo. Typically, a user knows which problems the user would like to fix in a photo. However, the user does not necessarily know which tools or interfaces to use in order to fix these problems. Most image editing applications provide numerous features that a typical user does not use because the user does not understand what the feature does or how to use the feature. For example, a user might not understand the terminology used by the application. A user may have a hard time selecting the exact area to which a change should be applied, or may not know this is necessary before proceeding. An improved method of editing an image file would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
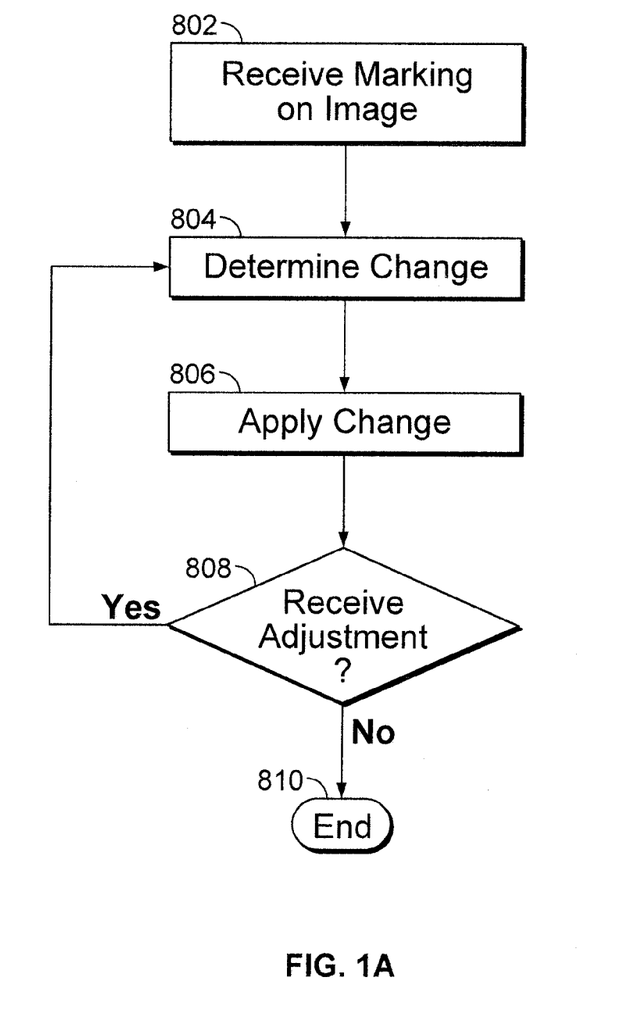
FIG. 1A is a flowchart illustrating an embodiment of a process for editing an image.

FIG. 1A is a flowchart illustrating an embodiment of a process for editing an image. The image file may include a photograph or other image file in any appropriate format, such as JPEG, TIFF, or BMP. In the example shown, a marking on an image is received at 802. A marking on an image, as used herein, refers to any graphical marking on an interface displaying the image. A marking may include one or more markings. The interface may include, for example, a graphical or other user interface to an image editing application. The marking may be superimposed on the image, adjacent to the image, or anywhere in the interface. A marking could include a markup, a gesture, and/or text. The marking could be a freeform marking. A user could use a mouse, keyboard, and/or other input device to draw the marking. For example, a user could draw a circle around a pair of eyes and enter the text "Remove red eye" next to the circle. The text and the circle would comprise markings.

A gesture, as used herein, refers to a mouse (or other pointing device) movement associated with a meaning. A gesture may include a marking that is associated with a change. For example, if an "X" is associated with the change "delete," a user could draw an "X" over an object in a photo to indicate that removal of the object is desired. Alternatively, the user could move a mouse in the shape of an "X" without marking the photo. In another example, moving the mouse in the shape of a "P" may mean print.

Figure 1B:
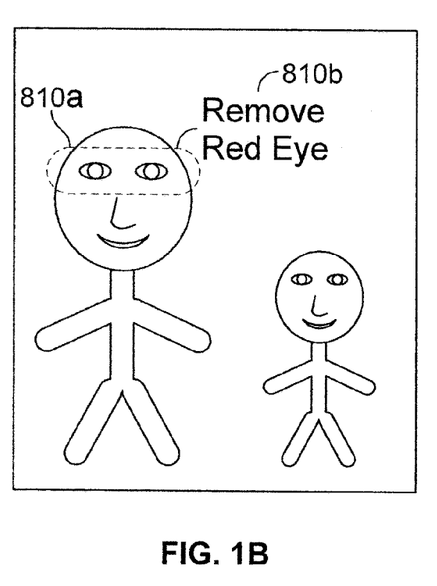
FIGS. 1B-1D illustrate examples of various markings.
Figure 1C:
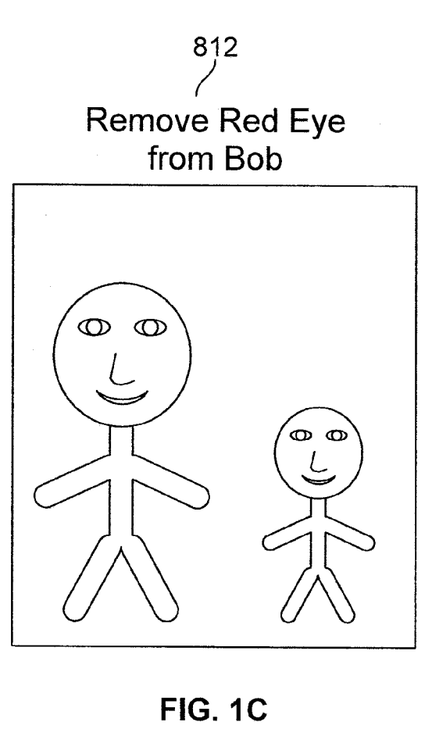
Figure 1D:
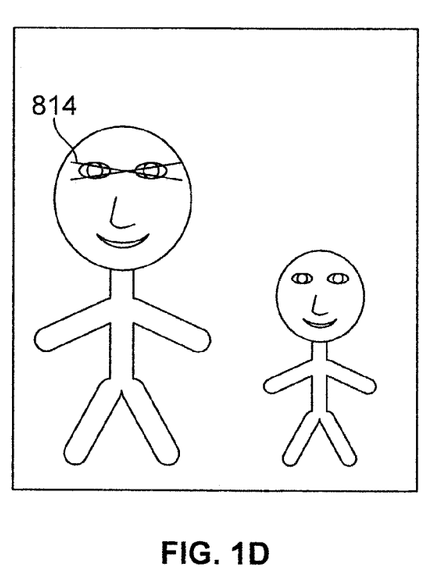

At 804, a change is determined based on the marking. A change includes an edit to the image. Various markings may be associated with the same change. For example, FIGS. 1B-1D illustrate examples of various markings. In FIG. 1B, markup 810a is a circle around a pair of eyes. Text 810b says "Remove red eye." A line connects markup 810a to text 810b. The line may be drawn by a user, or automatically drawn. For example, a user may first draw markup 810a. In response, a dialog box or other command interface may open. Alternatively, the user could trigger the dialog box, for example, by double clicking on markup 810a. The dialog box could include a place for entering a command, such as text 810b. When the dialog box is closed, the markings would appear as shown. In FIG. 1C, text 812 says "Remove red eye from Bob." Text 812 is located adjacent to the image. The user may have previously tagged a face in the picture with "Bob," for example. In FIG. 1D, gesture 814 is an "X" over a pair of eyes. In some embodiments, the same change determined for the markings shown in FIGS. 1B-1D is the same, and that is to remove the red eye of the face on the left.

The command interface can be either displayed to the user for entry or not displayed and a command entry made based on an interpretation of the marking. For example, if the marking is a gesture, then a command associated with that gesture may be entered. A command interface may include an application programming interface (API). A command may include a change provided by a user (in the user's own words or selected from machine provided choices) or a change that is generated based on a marking.

Returning to FIG. 1A, the change is applied at 806. For example, in the case of FIGS. 1B-1D, a red eye removal technique may be applied to the face on the left. In some embodiments, the change is applied as a preview before the change is applied. At 808, it is determined whether a user adjustment is received. For example, the user may view the change and decide to adjust a marking or a parameter associated with the change. For example, if the change was to lighten a portion of a photo, the user may enlarge the portion of the photo (e.g., by making a circle bigger) that is lightened and/or change the percentage by which the photo is lightened. If an adjustment is received, the process returns to 804, in which a change is determined. In this case, the change is based on the user adjustment. As such, the user can continuously adjust a photo until the user is satisfied with the results. If an adjustment is not received at 808, the process ends at 810.

In some embodiments, a plurality of markings are received at 802. A plurality of changes may be determined at 804. The changes may all be applied at 806. Each change may be individually previewed at 806 before applying the change. An adjustment that affects any of the changes may be received at 808.

Figure 2:
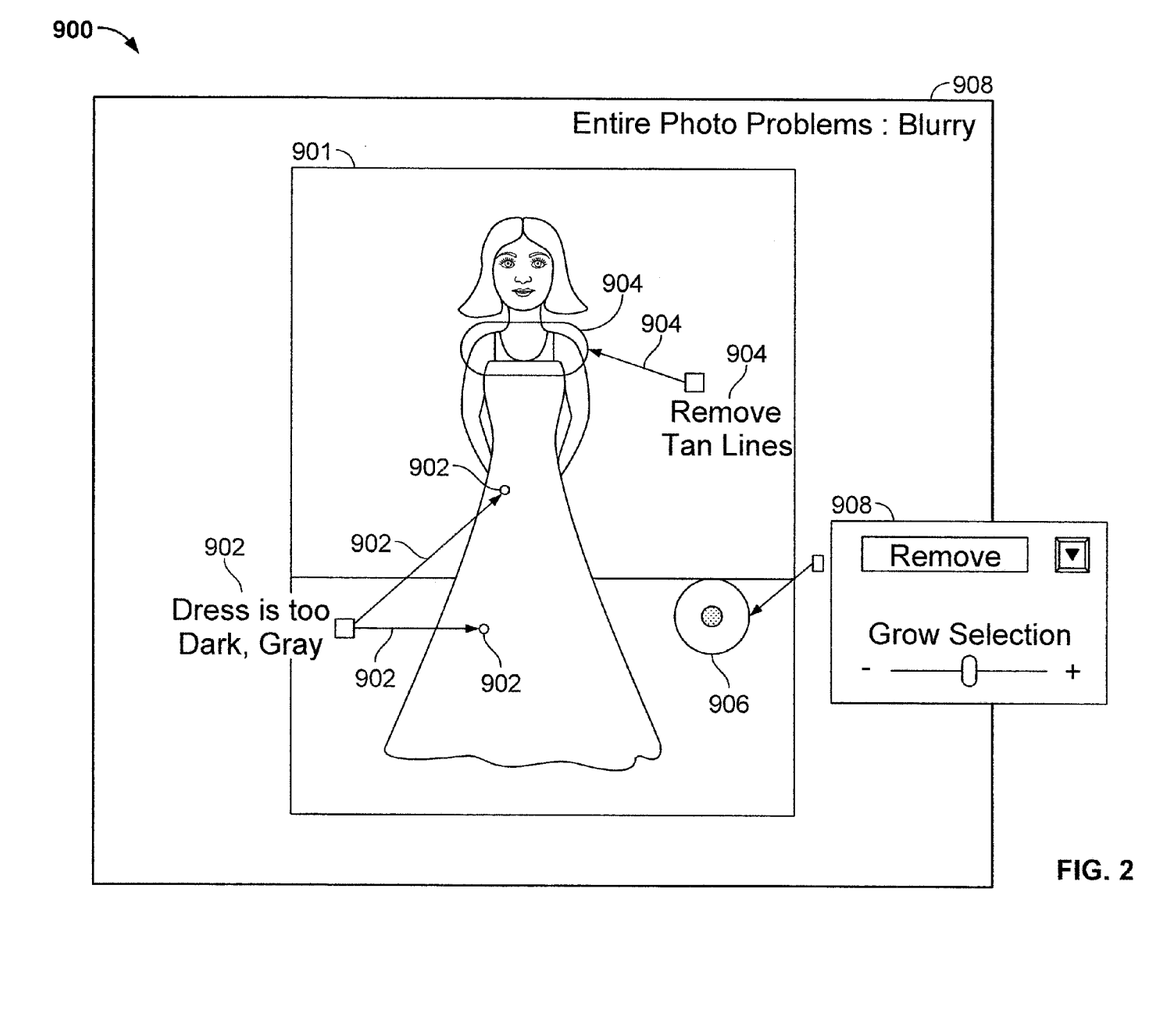
FIG. 2 is an example illustrating markings on an image.

FIG. 2 is an example illustrating markings on an image. Interface 900 displays image 901, which depicts a person wearing a white dress. There are a few problems with the photo. There are two areas on the dress that are too dark. The person has tan lines on her shoulders. There is also a spot on the floor. In addition, the entire photo is blurry. Upon seeing these problems, a user may mark up the photo with markings 902, 904, 906, and 908.

In this example, a user is in the process of creating markings 906. Markings 906 include a circle around the spot on the floor. For example, the user may have drawn the circle (or other shape) around the spot on the floor, and command interface (window) 908 may have opened in response. Window 908 may include a place (e.g., a text entry field) for the user to enter text or select from a menu of changes to apply to the circled portion of the photo. The menu choices may include default menu choices and/or choices that are generated based on the marking, as more fully described below. The machine's best guess may be pre-filled in a text field. For example, the area within the circle may be analyzed and it may be automatically determined that there is an undesirable spot on the floor. As a result, "Remove spot" or "Remove" (as shown) may be provided as a menu option. Alternatively, the user could enter the text "Remove." Such a window may include other ways to receive user input, such as a slider bar, as shown. The slider bar allows the user to indicate using a slider whether to increase or decrease the region the change would affect. For example, the spot may be desirable by the user, in which case, the user may want to resize the spot. Any parameter related to the change may be shown in window 908. After closing window 908, markings 906 may include text describing the command (e.g., "Remove") in place of window 908.

Markings 904 include an arrow from the text "Remove tan lines" to a circle around the tan lines. For example, a user may have drawn the circle. The text "Remove tan lines" may have been selected or entered by the user in an interface such as window 908.

Markings 902 include arrows from the text "Dress is too dark, gray" to two bullets. In some embodiments, markings 902 is a grouping of two markings. For example, a user may have drawn one of the bullets, and entered the text "Dress is too dark." The user may then have drawn the other bullet, and entered the text "too gray." The two markings may have been grouped or consolidated to combine the text into "Dress is too dark, gray" and the arrows may have been adjusted, resulting in markings 902.

Marking 908 includes text only and is not located on image 901. In some embodiments, text that refers to changes that apply to the entire image are displayed outside of the image.

Interface 900 allows a user to more naturally describe what the user would like adjusted and where. For example, the user may describe what the user does not like about the photo, what needs to be fixed, and/or how it should be fixed using markup, gestures, and/or their own text descriptions on the photo. The user may also specify non-exact regions for these descriptions by circling the general area, pointing to an object, etc. The user may use natural language commands, such as "this photo looks too blue," "this area is too dark," "I want to remove this blemish," or "Just the green in this general area should be brighter." Natural language processing may be used to understand standard words that a user might use and translate them into changes, which can be mapped to algorithms, to apply to an image.

Figure 3A:
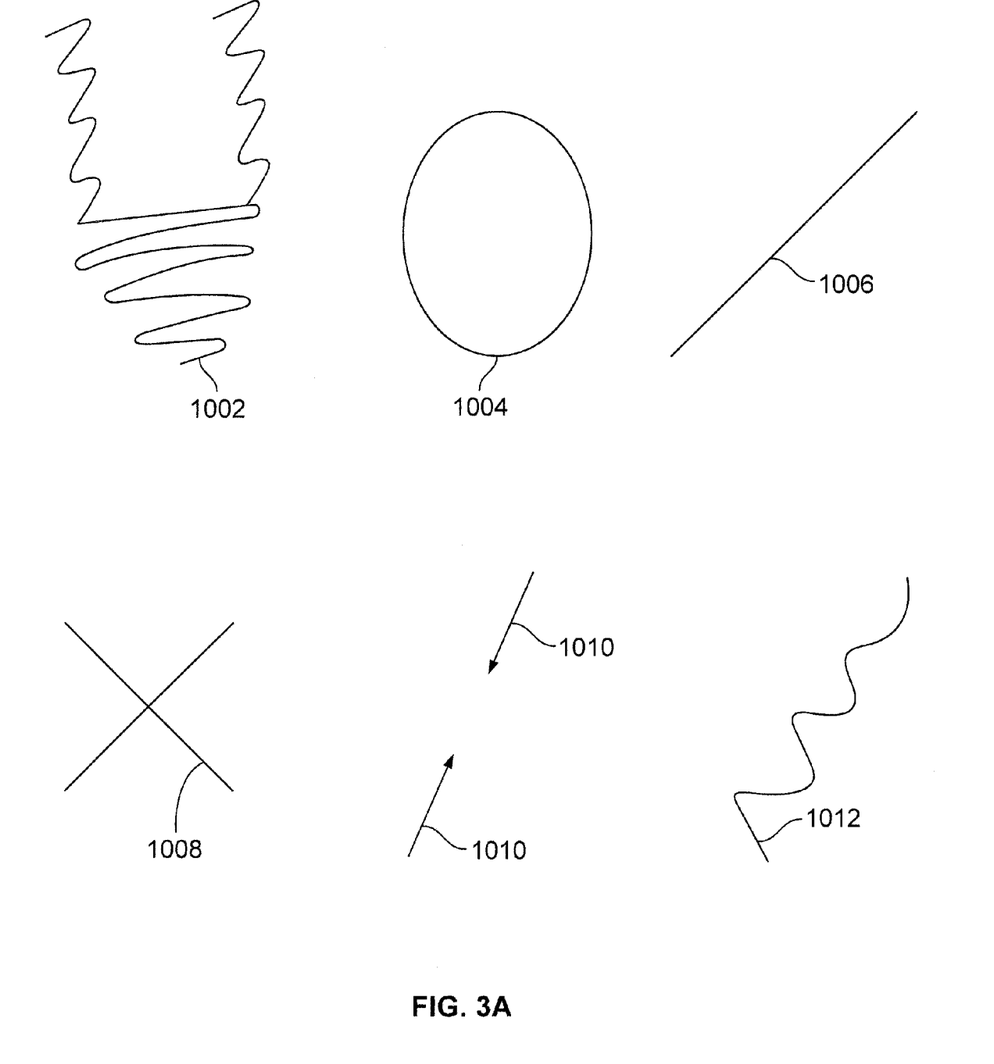
FIG. 3A illustrates examples of markings.

FIG. 3A illustrates examples of markings. In this example, marking 1002 may be used to indicate a selection of a portion of an image, such as an object, to which to apply a change. The user roughly scribbles over the portion in order to indicate the selection.

Marking 1004 may be used to indicate a selection of a portion of an image by roughly circling the portion, such as an object. Marking 1004 may be circular, rectangular, or any predefined or freeform shape. For example, a user could draw a freeform shape that roughly outlines an object in an image. Marking 1006 is a line, and may be interpreted in various ways. For example, marking 1006 could indicate an area which the line points to, or an area near the line, depending on what is near the line in the image.

Markings 1002, 1004, and 1006 may be referred to as sloppy selection. Various techniques can be used to handle sloppy selection (e.g., convert a sloppy selection into a precise pixel selection). For example, techniques based on Graph Cut, GrabCut may be used. In some embodiments, the selection is based at least in part on other markings, such as text. For example, if the user has entered the text "lighten" next to a circle around an already white object in the image, then a portion of the image other than the white object will be selected, such as the background.

Marking 1008 may be a gesture that is used to indicate the removal of an object. Marking 1010 may be a gesture that is used to indicate that a portion of the photo should be pinched. Marking 1012 may be a gesture that is used to indicate that the portions of the image the two sides of marking 1012 should be blended or healed.

Figure 3B:
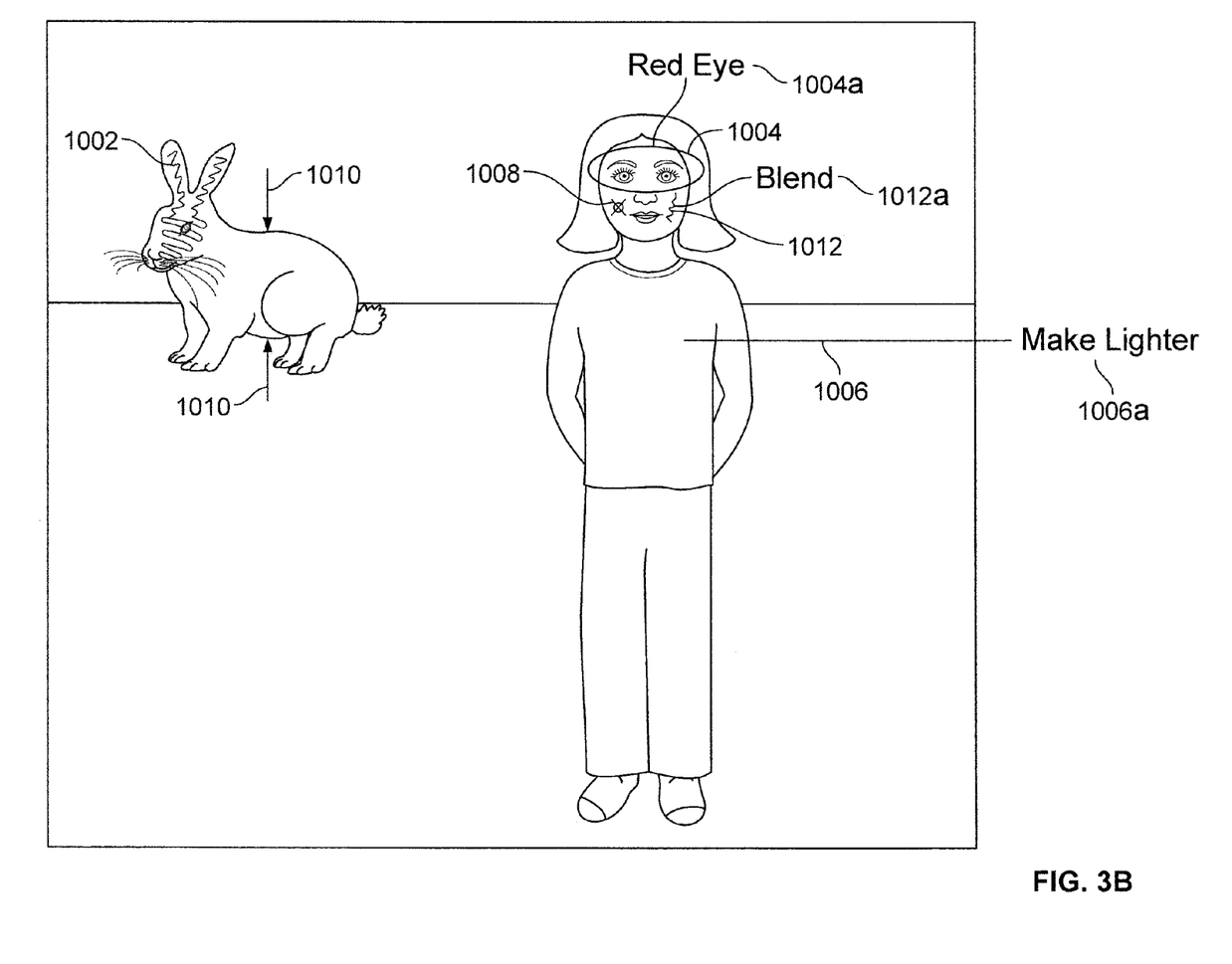
FIG. 3B is an example of an image in which markings 1002-1012 are used.

FIG. 3B is an example of an image in which markings 1002-1012 are used. As shown, marking 1002 is used to select a rabbit face. Marking 1010 is used to indicate that the rabbit should be made skinnier. Marking 1008 is used to indicate that a blemish should be removed. Markings 1004 and 1004*a* are used to indicate that red eye should be removed. Markings 1012 and 1012*a* are used to indicate that the skin tone should be blended (perhaps to make a cut on the person's face less visible). Markings 1006 and 1006*a* are used to indicate that a shirt should be lightened. Text markings 1004*a*, 1012*a*, and 1006*a* may be used in conjunction with markup or gestures to indicate the correction.

Figure 4:
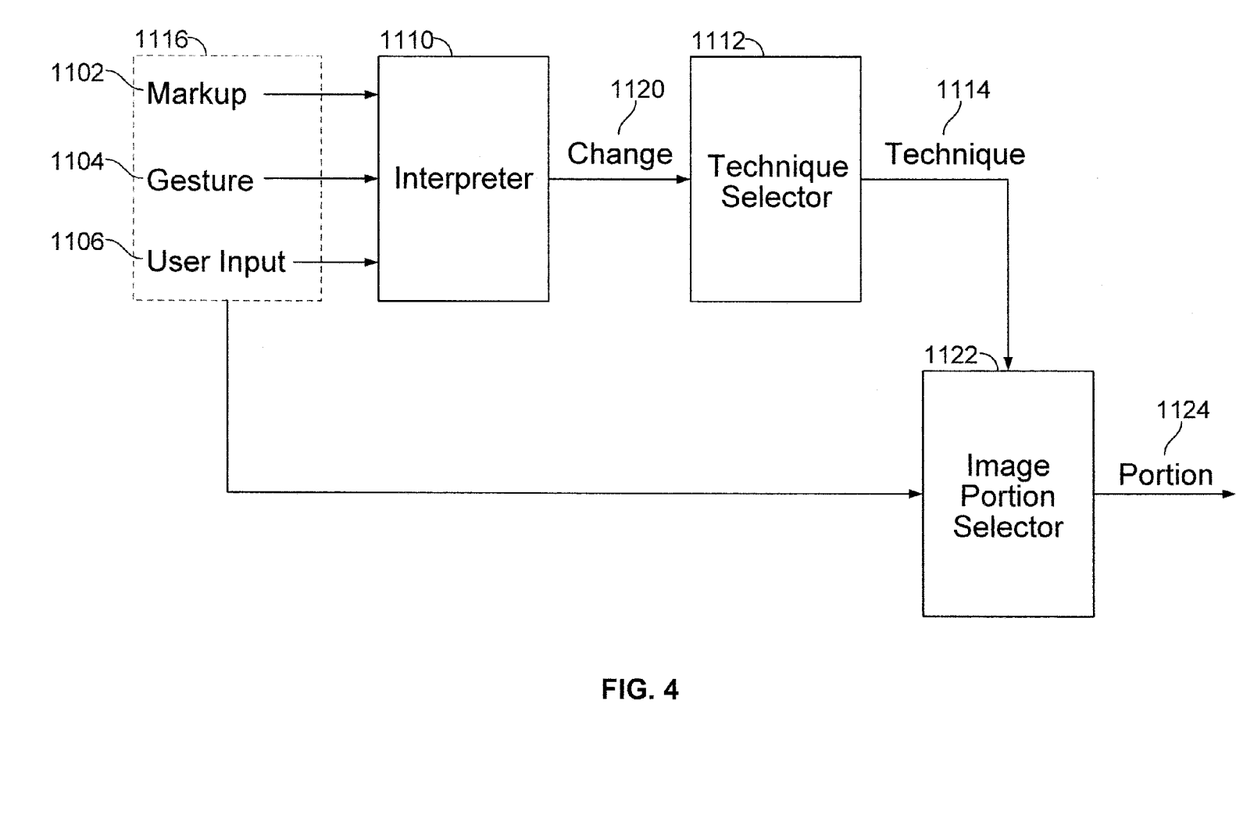
FIG. 4 is a block diagram illustrating an embodiment of a system for interpreting markings.

FIG. 4 is a block diagram illustrating an embodiment of a system for interpreting markings. In this example, markings 1116 are provided as input. Markings 1116 include markup 1102, gesture 1104, and user input 1106. User input 1106 includes any user input commands, such as natural language, predefined text, or a menu selection. User input 1106 may include parameters associated with changes, such as a percentage.

Markings 1116 are provided to an interpreter 1110. Interpreter 1110 interprets or translates markings 1116 to determine changes 1120 to apply to the image. Interpreter 1110 may interpret markings 1116 by performing natural language processing. For example, natural language detection techniques may be used to map a user's words to commands that an application supports. For example, if the application is Adobe Photoshop® Elements, the user words "too dark" can be mapped to "change Shadow/Highlights" with no change to highlights and a "lighter" change to the shadows. This can be done using natural language techniques and/or a library of typical terms used in describing problems with photos.

Interpreter 1110 may use gesture recognition to understand that the user is drawing or has drawn a symbol (e.g., an "X", a circle, a rectangle, etc.) and map the gesture to the definition of a region and/or command(s).

Some gestures can be directly translated to a change. This is done by having a library of typical gestures used in describing problems with photos (X=remove, arrows in=pinch, etc) and matching gestures not in the library to a defined gesture that is similar. The gesture may be mapped to a change, similar to how text may be mapped to a change.

In the case where interpreter 1110 cannot translate markings 1116 to a degree of certainty, the interpreter may ask the user for more information and/or offer a short list of "best guesses" to choose from. More information may be received via user input 1116.

Over time, or by direct request of the user, the interpreter can learn a particular user's language and gestures for more efficient translation. For example, the user may decide to start using "r.e." instead of typing "red eye."

In some embodiments, interpreter 1110 generates a set of changes and the user may modify the changes directly or by going back and changing one or more of markings 1116. For example, if markup 1102 includes an "X" over a pair of eyes, a change generated may be to remove red eye. An interface may be provided for the user to accept (or verify), modify, or reject the change.

In some embodiments, interpreter 1110 may be used to assist a user with creating markings. For example, a user may draw a circle around a pair of eyes. In response, a command interface, such as a dialog box or other window, may open. The window may include generated and/or pre-defined changes for the user to select. "Remove red eye" may be a generated change because the machine may have detected that the circle contains red eyes. The change generated may not be a change the user desires. For example, the user wants to remove red eye, but the generated changes are "brighten" and "sharpen." If a change is not generated or the only generated choices are not what the user wants, the user may enter the text "remove red eye."

Interpreter 1110 determines changes 1120 based on markup 1102, gesture 1104, and user input 1106. For example, interpreter 1110 may determine changes 1120 based on a selected area, which may be determined based on markup 1102, gesture 1104, and/or user input 1106. For example, if a pair of eyes is circled, changes 1120 may include remove red eye. In another example, if "X" is drawn over a pair of eyes, changes 1120 may include remove red eye.

The changes are provided to technique selector 1112. A technique includes an algorithm or command(s). Technique selector 1112 selects technique 1114 to apply to implement a change. For example, to remove red eye on a selected face, a technique for removing red eye may be applied to the selected face. To lighten a portion of an image, a lightening technique can be applied.

In this example, markings 1116 and technique 1114 are provided as input to image portion selector 1122. Image portion selector 1122 selects portion 1124 of an image to which to apply one or more changes. Portion 1124 may include, for example, an object in the image. Portion 1124 may be selected based on markings 1116 and/or technique 1114. For example, if markings 1116 include a circle around a person and technique 1114 includes a red eye removal algorithm, then image portion selector 1122 may select the person's eyes. In another example, if user input 1106 includes the text "Remove red eye from Bob," then image portion selector 1122 selects the person's eyes if the person has been previously tagged Bob.

In some embodiments, for regions, standard shapes and closed paths are recognized. If the path is closed, the region is taken as the area inside that path. If the path is not closed, more interpretation is needed based on properties of the region alone or in conjunction with the text. For example, a line pointing to a very dark area may be interpreted as "all dark spots touching where this line points to," whereas a line pointing to a gray area cannot be interpreted alone. If the text states, "too gray, should be white," the region would be interpreted as all grayish colors touching this spot.

In some embodiments, image portion selector 1122 selects a portion based on change 1120 rather than technique 1114. In some embodiments, both change 1120 and technique 1114 are used to select a portion.

Portion selector 1122 may select a general region or a more exact region. Once the technique is determined and the portion for the technique is determined, an exact area and parameters associated with the technique may be determined. For example, consider a region defined by a circle. In some cases, some algorithms should not be run on the entire encircled area.

For example, to blend out a cut on a person's hand, it may be that the "heal" command should only be applied on the cut and very little of the surrounding skin. Because the command is "heal," an encircled area may be further refined. An object close to the size of the circle but within it would be determined.

A "Lighten Shadows" command may run on the dark spots within a given area, but not on the light spots. It may be applied in different percentages to different spots, depending on how light they already are. The command may also be applied in the surrounding area, perhaps with lower intensity, in order to create a realistic, blended effect. Therefore, the selected area may be further broken down into various degrees of dark and light spots. Different levels of lightening may be applied to the different levels of dark spots. In addition, the area outside the selected area may be affected, with diminishing amounts of lightening applied moving further from the selected area, enabling a blending effect.

A "Remove Red Eye" command removes red from a circular area of a pupil. A circle around two eyes may be further broken down in order to avoid removing other red spots like red eyeglasses. In some embodiments, the textual description of the circle maps to the "remove red eye" command, and red circular areas within the general region are found, and the fix only applied to those areas.

Figure 5:
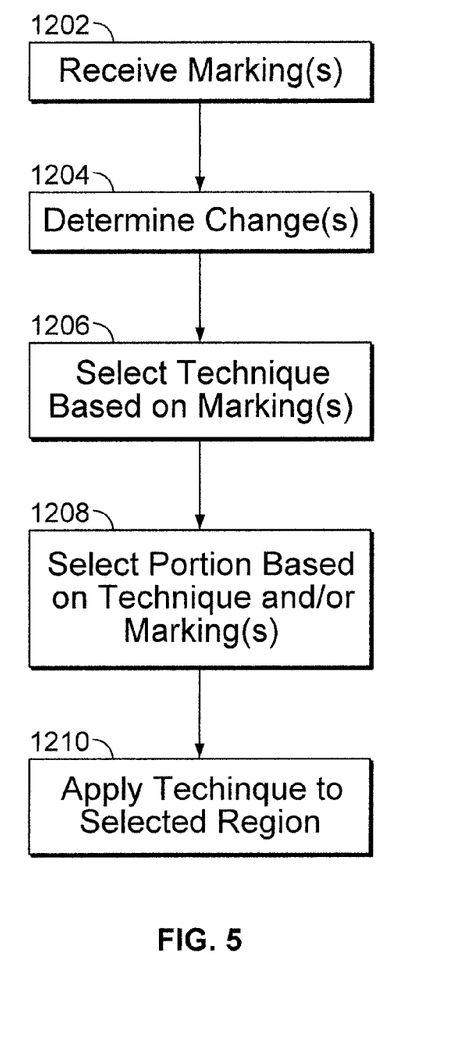
FIG. 5 is a flowchart illustrating an embodiment of a process for selecting a technique and a portion of an image.

FIG. 5 is a flowchart illustrating an embodiment of a process for selecting a technique and a portion of an image. For example, a machine may perform this process. At 1202, one or more markings are received. A marking can include a markup, a gesture, and/or text, such as natural language specified by a user. At 1204, one or more changes are determined based on the markings. For example, in response to the markings, interpreter 1110 may generate interpreted changes that it believes the user is requesting based on the markings. The user can modify, accept, or reject an interpreted change. At 1206, one or more techniques are selected based on the markings. For example, technique selector 1112 may select one or more techniques to run based on the changes.

At 1208, a portion of the image is selected based on the selected techniques and the markings. For example, image portion selector 1122 may be used to select the portion of the image. At 1210, the selected techniques are applied to the selected portion.

For example, the user may have pointed to a background area in the photo and typed "too dark." This may be interpreted as needing to use the "lighten shadows" function that it has on that background area. Lighten Shadows is run and the area becomes less dark. Similarly, the user may have typed "lighten this," "Lighten the shadows a little," "make brighter," or "less black," which may all be translated to using the "lighten shadows" function or technique.

The user may have drawn an "X" over a cut on the hand of someone in the photo. This may be interpreted as needing to use a "healing" function on that area of the hand. The healing function is run and the cut disappears. Similarly, the user may have drawn a naught symbol, put lines through the cut, or circled the cut and typed "remove," and this may be translated in the same way.

Figure 6:
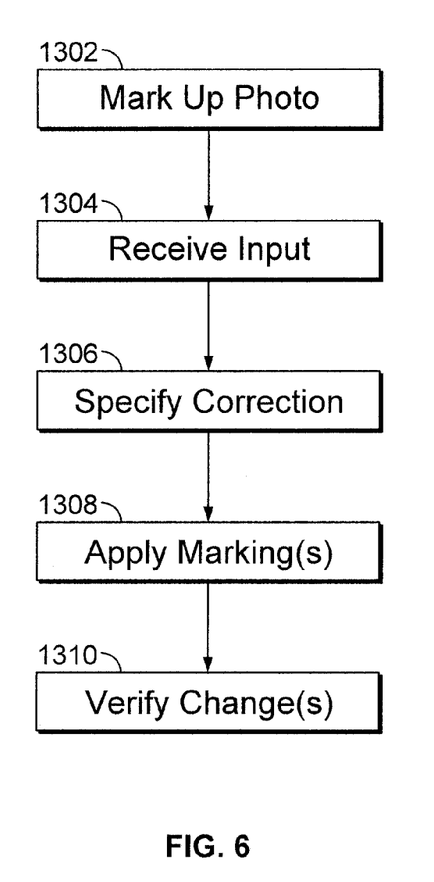
FIG. 6 is a flowchart illustrating an embodiment of a process for editing a photo.

FIG. 6 is a flowchart illustrating an embodiment of a process for editing a photo. For example, a user may perform this process. At 1302, a photo is marked up. For example, a user may mark up a photo with markings using a mouse, keyboard, and/or other input device. A tool may be used to enable the user to draw directly on an image on-screen. The markings may include markup, gestures, or text. Users may describe what they don't like about the photo, what needs to be fixed, and/or how it should be fixed using gestures and their own text descriptions on the photo. The user may also specify non-exact regions for these descriptions—circling the general area, pointing to an object, etc.

At 1304, an input is received in response to the markup. For example, an input window opens in response to the user creating a marking. The window provides an interface for the user to provide input relating to the marking. For example, a user draws a circle or an "X" on a portion of an image, and an input window opens. 1304 is optional. At 1306, a correction is specified. For example, the user can use the input window to input the correction. In some embodiments, the user may specify the correction using natural language. In some embodiments, the user may select the correction from a list of predefined and/or machine selected corrections. Alternatively, the correction may be implicit in the marking. For example, an "X" may both identify (i.e., select) an area and indicate that an object in that area should be removed. At 1308, the markings are applied. For example, the user selects a "Go" or "Apply All" button to apply the marking. In some embodiments, each marking is applied as soon as they are drawn. In other words, the markings are applied real time. At 1310, the changes are verified. For example, a list of the changes that were made may be provided, and the user can go down the list to check the changes. If the user is dissatisfied with a change, the user can manually fix it.

In some embodiments, each marking can be previewed and applied. For example, the right mouse button might include "preview," "apply," and "undo" options. In another example, such options might be available from an input window. The input window may open in response to drawing a marking or may open when the user double clicks on the marking or performs another action. In some embodiments, markings may be toggled on or off For example, when the preview is on, the markings are in an "on" state, the markings are shown on the photo. When the markings are in an "off" state, the markings are not shown and a preview of the markings as applied is shown.

Figure 7:
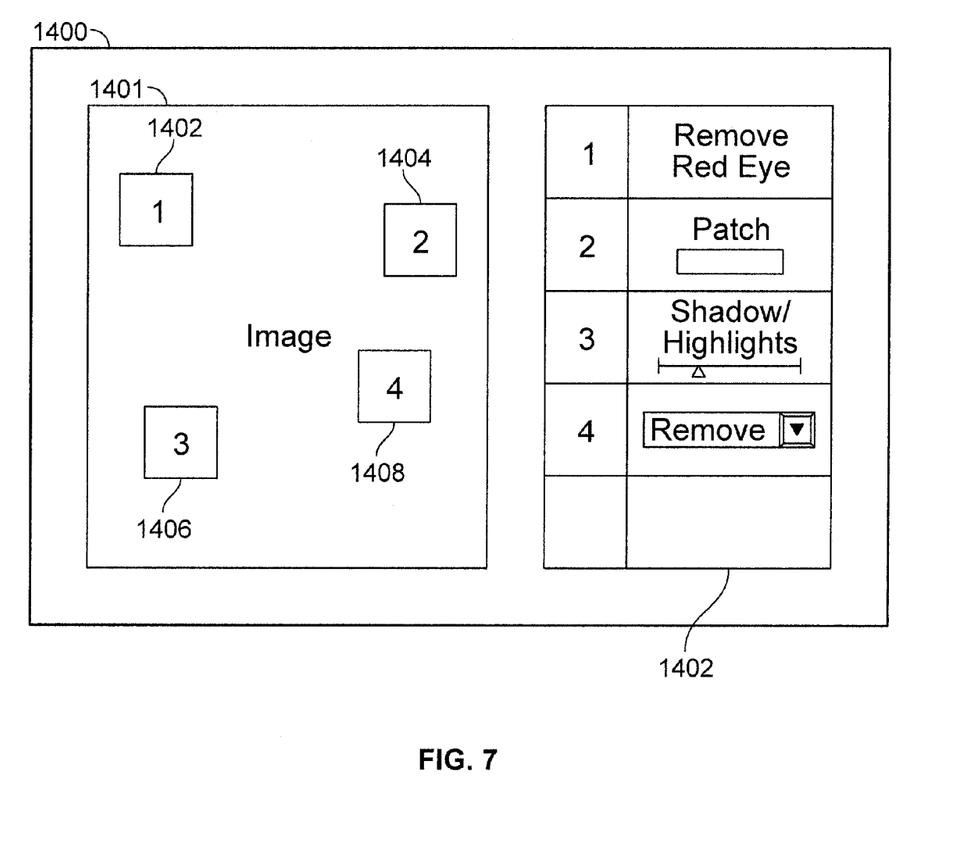
FIG. 7 illustrates an embodiment of an interface for editing a photo.

FIG. 7 illustrates an embodiment of an interface for editing a photo. In this example, interface 1400 includes a display of image 1401 and sidebar 1402. Image 1401 includes markings 1402, 1404, 1406, and 1408 displayed on the image. In this example, each marking is associated with an identifier that is displayed on the image. As shown, the identifiers for markings 1402, 1404, 1406, and 1408 are 1, 2, 3, and 4, respectively. Sidebar 1402 shows the changes associated with each identifier. Sidebar 1402 may be a window, menu, sidebar, or any other appropriate interface. Sidebar 1402 may be used to preview, adjust, or undo changes. Sidebar 1402 may be used before or after changes are applied. In some embodiments, sidebar 1402 is displayed after changes have been applied for the user to review and verify changes.

Using sidebar 1402, a user can insert, modify, accept, or reject a change associated with a marking. For example, marking 1402 having identifier 1 is displayed at the top of sidebar 1402. As shown, marking 1402 is associated with a red eye fix. In sidebar 1402, the user may have selected the text "red eye" from a menu or entered the text "red eye" in free form. As shown, markings 1404, 1406, and 1408 are associated with the changes "patch," "shadow/highlight," and "remove," respectively. In sidebar 1402, various interfaces may be used for each change, including menus, slider bars, freeform text entry, etc. In some embodiments, sidebar 1402 includes a preview and apply button. In some embodiments, each change in sidebar 1402 includes a preview and apply button.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of editing an image, including:
   receiving a graphical marking on the image;
   activating a command interface in response to the graphical marking using a processor, wherein the command interface includes a set of menu command choices that are generated based on the graphical marking;
   receiving a command via the command interface; and
   applying the command to edit a graphical portion of the image, wherein the command is determined based at least in part on the graphical marking, and wherein the graphical portion is determined based at least in part on the graphical marking.

2. A method as recited in claim 1, wherein the graphical marking includes a markup.

3. A method as recited in claim 1, wherein the graphical marking includes a gesture.

4. A method as recited in claim 1, wherein the graphical marking includes text.

5. A method as recited in claim 1, wherein the graphical marking indicates a change to edit the graphical portion of the image, wherein the image is stored in an image file.

6. A method as recited in claim 1, wherein the command interface is displayed.

7. A method as recited in claim 1, wherein the command includes text.

8. A method as recited in claim 1, wherein the command includes natural language.

9. A method as recited in claim 1, wherein applying includes determining a change.

10. A method as recited in claim 1, wherein applying includes determining a change based at least in part on the graphical marking.

11. A method as recited in claim 1, wherein applying includes mapping the command to a command supported by an application.

12. A method as recited in claim 1, wherein the graphical portion is determined based at least in part on the command.

13. A method as recited in claim 1, further including receiving a plurality of markings and applying the plurality of markings together.

14. A method as recited in claim 1, wherein markings that are similar are combined.

15. A method as recited in claim 1, further including displaying a preview of an applied command.

16. A method as recited in claim 1, further including displaying a preview by toggling to an "off" state and displaying the graphical marking by toggling to an "on" state.

17. A method as recited in claim 1, wherein the graphical marking includes a selection of an object of the image.

18. A method as recited in claim 1, wherein the graphical marking includes a selection of an object of the image, and the command includes a selection of a function for editing an attribute of the image, wherein the image includes a digital photo.

19. A system for editing an image, including:
a processor; and
a memory coupled with the processor, wherein the memory is configured to provide the processor with instructions which when executed cause the processor to:
receive a graphical marking on the image;
activate a command interface in response to the graphical marking, wherein the command interface includes a set of menu command choices that are generated based on the graphical marking;
receive a command via the command interface; and
apply the command to edit a graphical portion of the image, wherein the command is determined based at least in part on the graphical marking, and wherein the graphical portion is determined based at least in part on the graphical marking.

20. A system as recited in claim 19, wherein the memory is configured to provide the processor with an instruction which when executed causes the processor to apply the command by determining a change.

21. A system as recited in claim 19, wherein the graphical marking includes a markup, a gesture, or text, or wherein the graphical marking indicates a change to edit the graphical portion of the image, wherein the image is stored in an image file.

22. A system as recited in claim 19, wherein the graphical marking includes a selection of an object of the image, and the command includes a selection of a function for editing an attribute of the image, wherein the image includes a digital photo.

23. A system as recited in claim 19, wherein applying includes determining a change based at least in part on the graphical marking.

24. A system as recited in claim 19, wherein markings that are similar are combined.

25. A system as recited in claim 19, further including displaying a preview of an applied command.

26. A computer program product for editing an image, the computer program product being embodied in a computer readable storage medium and comprising computer instructions for:
receiving a graphical marking on the image;
activating a command interface in response to the graphical marking, wherein the command interface includes a set of menu command choices that are generated based on the graphical marking;
receiving a command via the command interface; and
applying the command to edit a graphical portion of the image, wherein the command is determined based at least in part on the graphical marking, and wherein the graphical portion is determined based at least in part on the graphical marking.

27. A computer program product as recited in claim 26, wherein applying includes determining a change.

28. A computer program product as recited in claim 26, wherein the graphical marking includes a markup, a gesture, or text, or wherein the graphical marking indicates a change to edit the graphical portion of the image, wherein the image is stored in an image file.

29. A computer program product as recited in claim 26, wherein the graphical marking includes a selection of an object of the image, and the command includes a selection of a function for editing an attribute of the image, wherein the image includes a digital photo.

30. A computer program product as recited in claim 26, wherein applying includes determining a change based at least in part on the graphical marking.

31. A computer program product as recited in claim 26, wherein markings that are similar are combined.

32. A computer program product as recited in claim 26, further including displaying a preview of an applied command.

* * * * *